Aug. 4, 1942.            R. INGLEE                 2,292,224
                       GUMMING MACHINE
                    Filed March 22, 1941          7 Sheets-Sheet 7

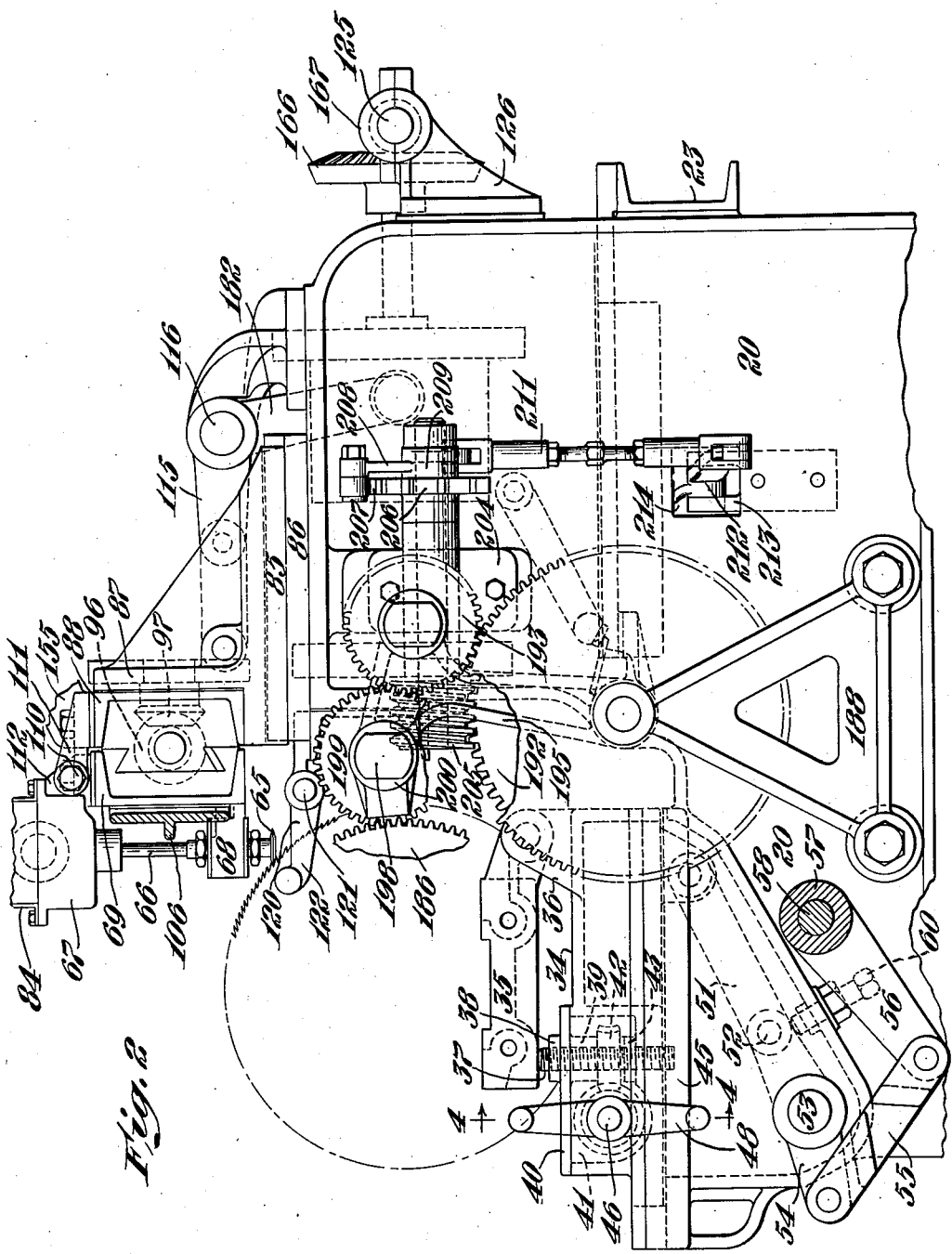

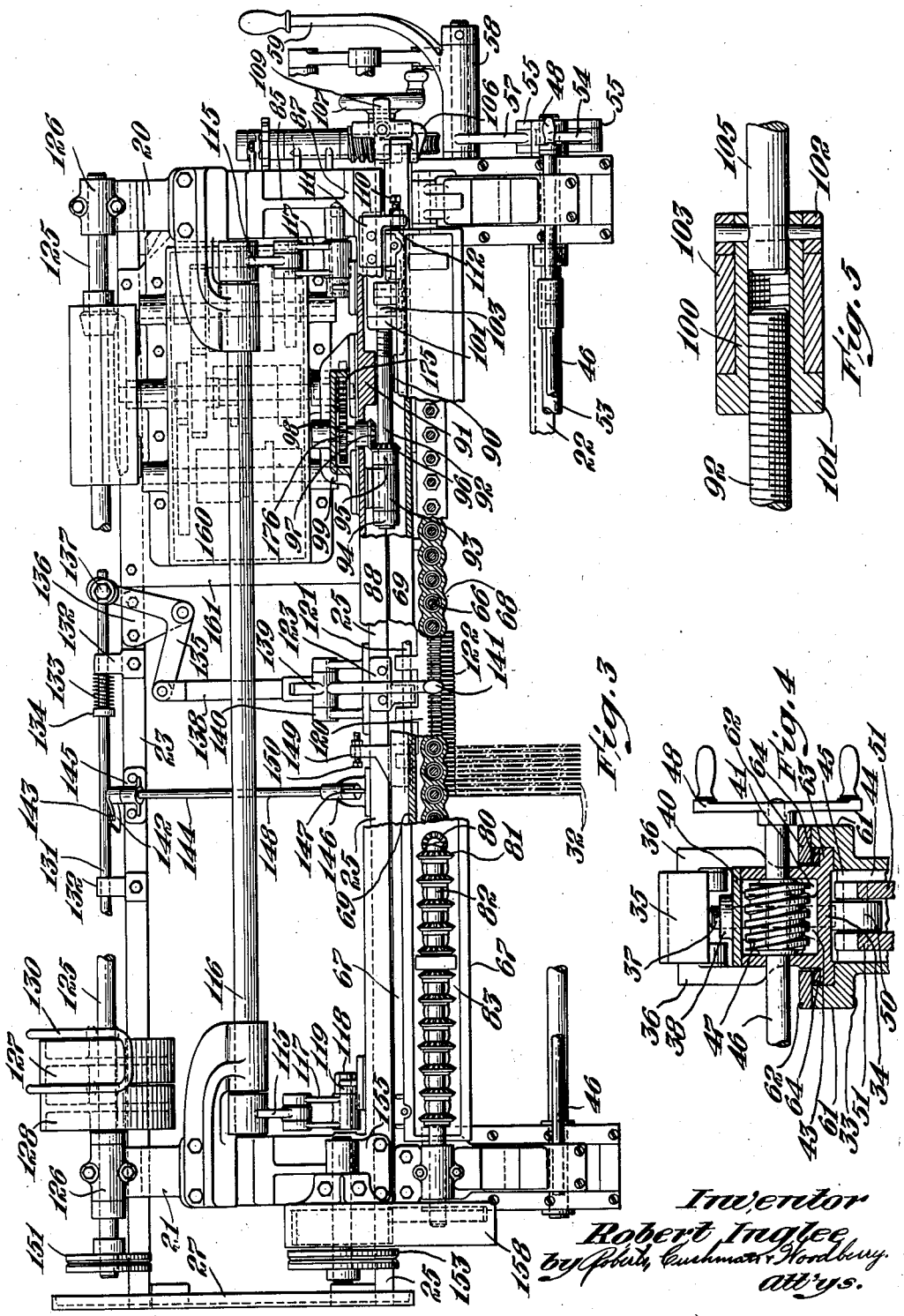

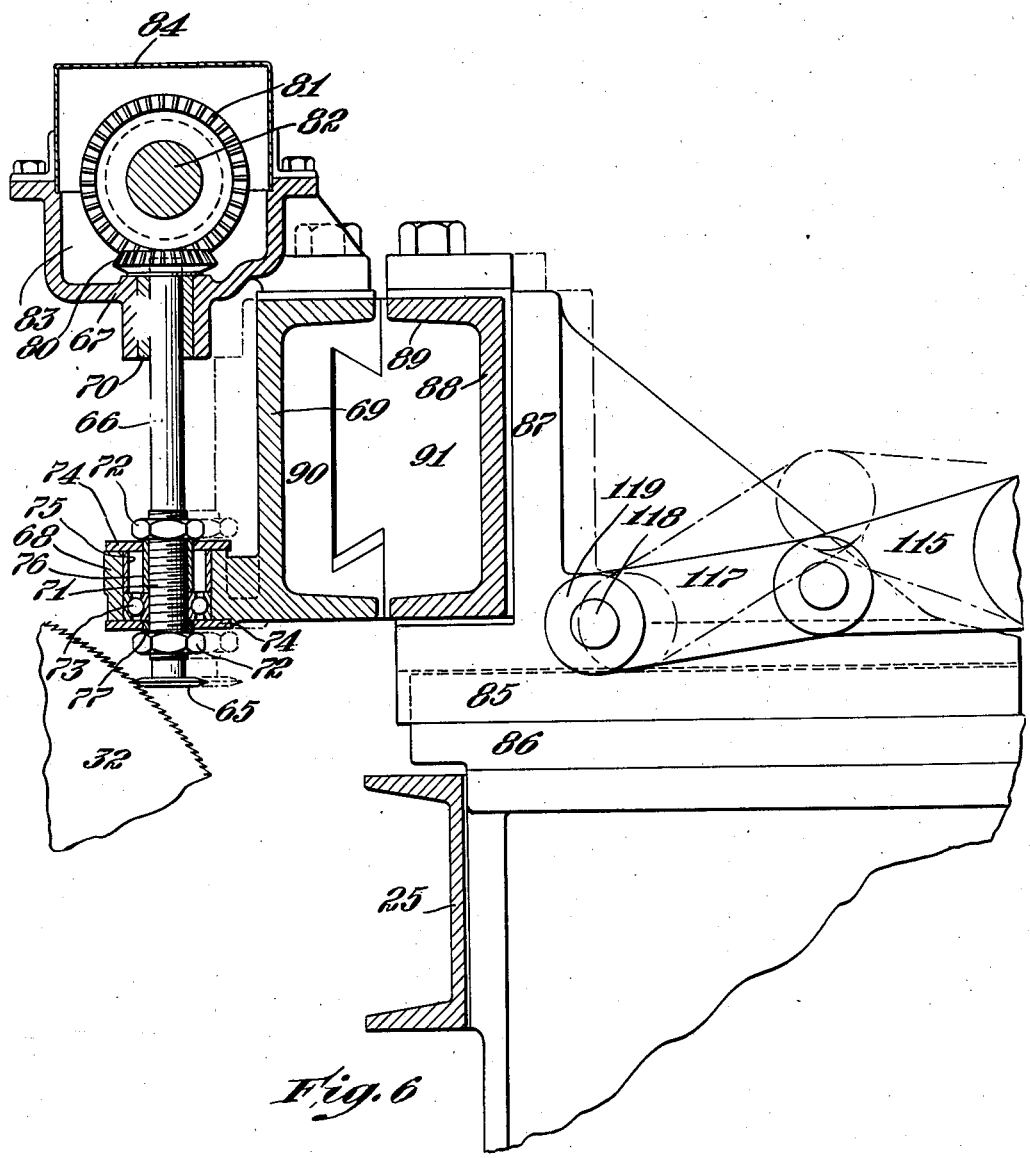

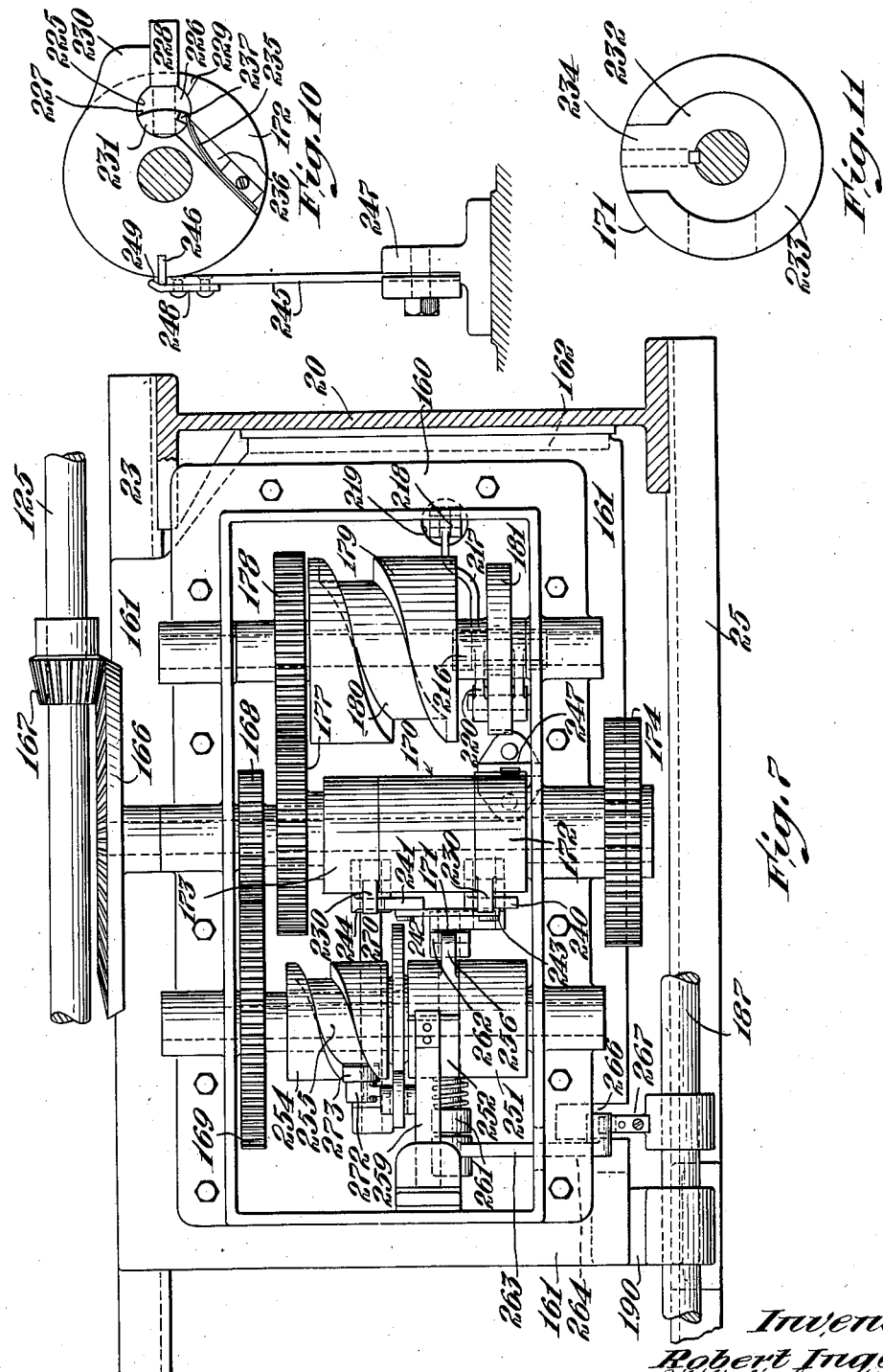

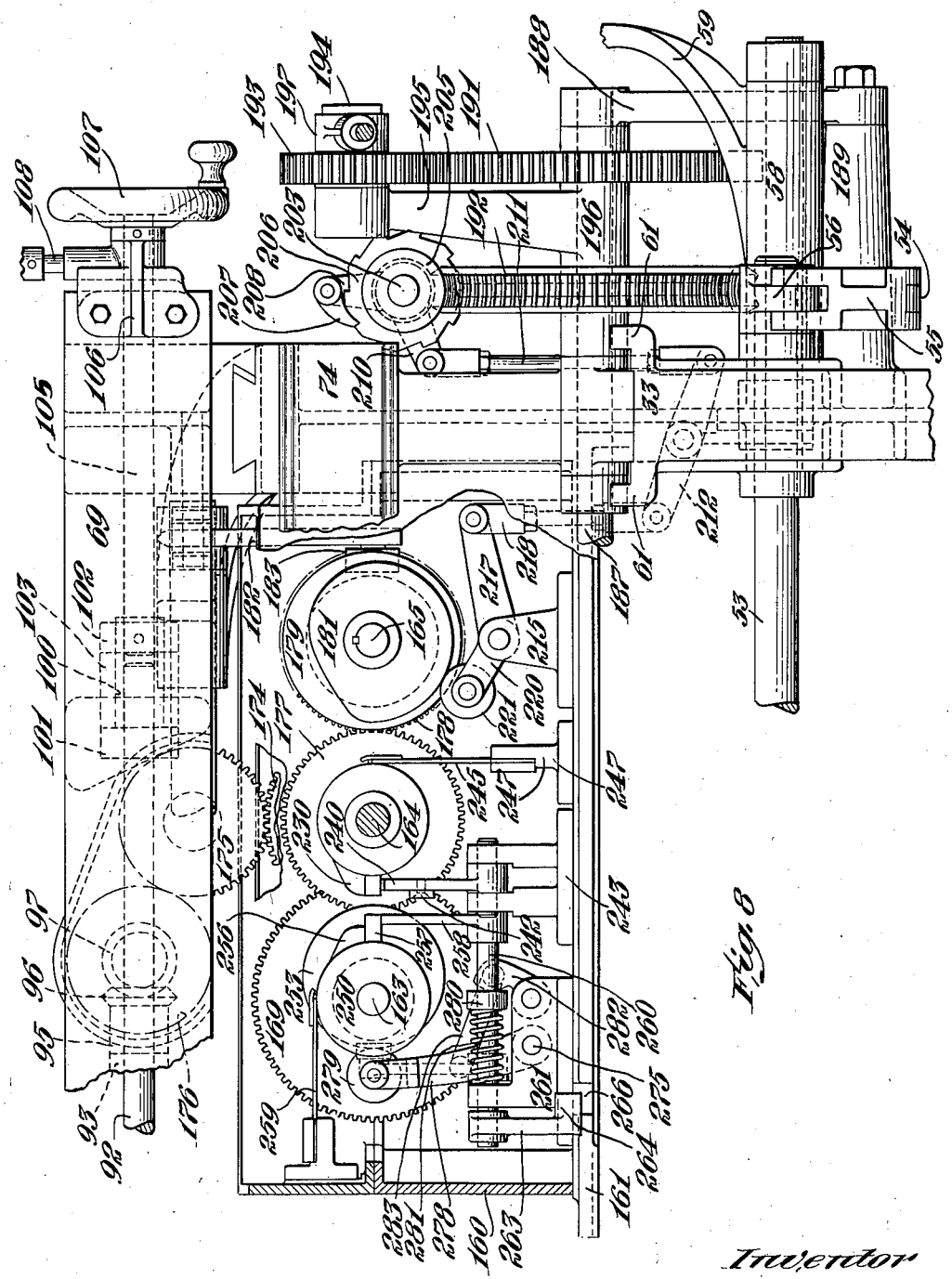

Inventor
Robert Inglee
by Roberts, Cushman & Woodbury
attys.

Patented Aug. 4, 1942

2,292,224

UNITED STATES PATENT OFFICE 2,292,224

GUMMING MACHINE

Robert Inglee, Westdale, Mass., assignor to The Murray Company, Dallas, Tex., a corporation of Texas Application March 22, 1941, Serial No. 384,647

17 Claims. (Cl. 76—32)

This invention relates to an improvement in a gumming machine in which the teeth of a circular gin saw are gummed by means of rotating disk files such, for example, as the machine shown and fully described in the patent to McLean No. 1,472,013 dated October 23, 1923.

As pointed out in said patent it is necessary, when a cotton gin is working at full capacity, to gum the saw teeth at frequent intervals, and since it is unusual that several extra cylinders be available the gumming operation must be performed in a minimum period of time and, in order that the gumming be correctly performed with a minimum of attention by the operator, it is essential that the saw cylinders be quickly and accurately mounted in the gumming machine; that the disk files be driven at high speed; that the saws be rotated by suitable indexing means so that each tooth is gummed in succession; that the disk files be moved into and out of engagement with the saw teeth; that, since it is impossible to gum adjacent saw blades simultaneously, the disk files after completing the gumming of one group of saw blades be moved longitudinally into engagement with the adjacent saw blades; that such movements of saw cylinder and disk files be repeated until all the teeth have been gummed; that, when this has been done, the machine be stopped so that the saw cylinder may be removed; and that all these operations except the mounting and removing of the saw cylinders be performed automatically.

The gumming of a gin saw requires that there be carried out a plurality of operations which operations include the mounting of the gin saw in the gumming position, the driving of the disk files by which the teeth are gummed, the reciprocation of the disk files into and out of the saw gumming position, the indexing of the gin saw tooth by tooth, such indexing taking place when the disk files are out of the gumming position, and the travel of the disk files longitudinally of the gin saw, after each group of blades has been gummed, in position for gumming the next adjacent group.

One feature of this invention is that the mechanism for indexing the gin saw includes an element by which at the completion of the gumming of one group of blades the reciprocation of the disk files is stopped and the longitudinal travel of such files is initiated.

Another feature of this invention is that the means for actuating the reciprocation of the disk files and the longitudinal travel of such disk files in timed relation to each other are assembled in close association with the control for such actuating means and further that such control is set into operation in timed relation to the gin saw indexing mechanism by an element carried by such mechanism.

Other features of the invention reside in the attainment of such advantages as simplicity in construction, centralization of control elements, positive engagement of the disk files with the saw teeth so that all the teeth of the gummed saw are uniform in contour and other advantages all as will appear from a consideration of the following description of this invention and of the drawings which illustrate one embodiment of the invention and in which Fig. 1 is an end elevation of a machine embodying this invention;

Fig. 2 is an end elevation on a larger scale of the upper portion of the machine, certain portions being broken away;

Fig. 3 is a plan view of the machine with portions broken away or omitted;

Fig. 4 is a sectional view taken along the line 4—4 in Fig. 2;

Fig. 5 is a sectional view on an enlarged scale of a portion of the means by which the disk file mechanism is moved longitudinally;

Fig. 6 is a fragmentary view of the disk file mechanism showing the transverse movement thereof;

Fig. 7 is a plan view of the gear box unit of the control mechanism;

Fig. 8 is a front view of such unit and a portion of the gin saw indexing mechanism;

Figs. 10 and 11 illustrate two elements of a clutch employed in the gear box.

Figure 1:
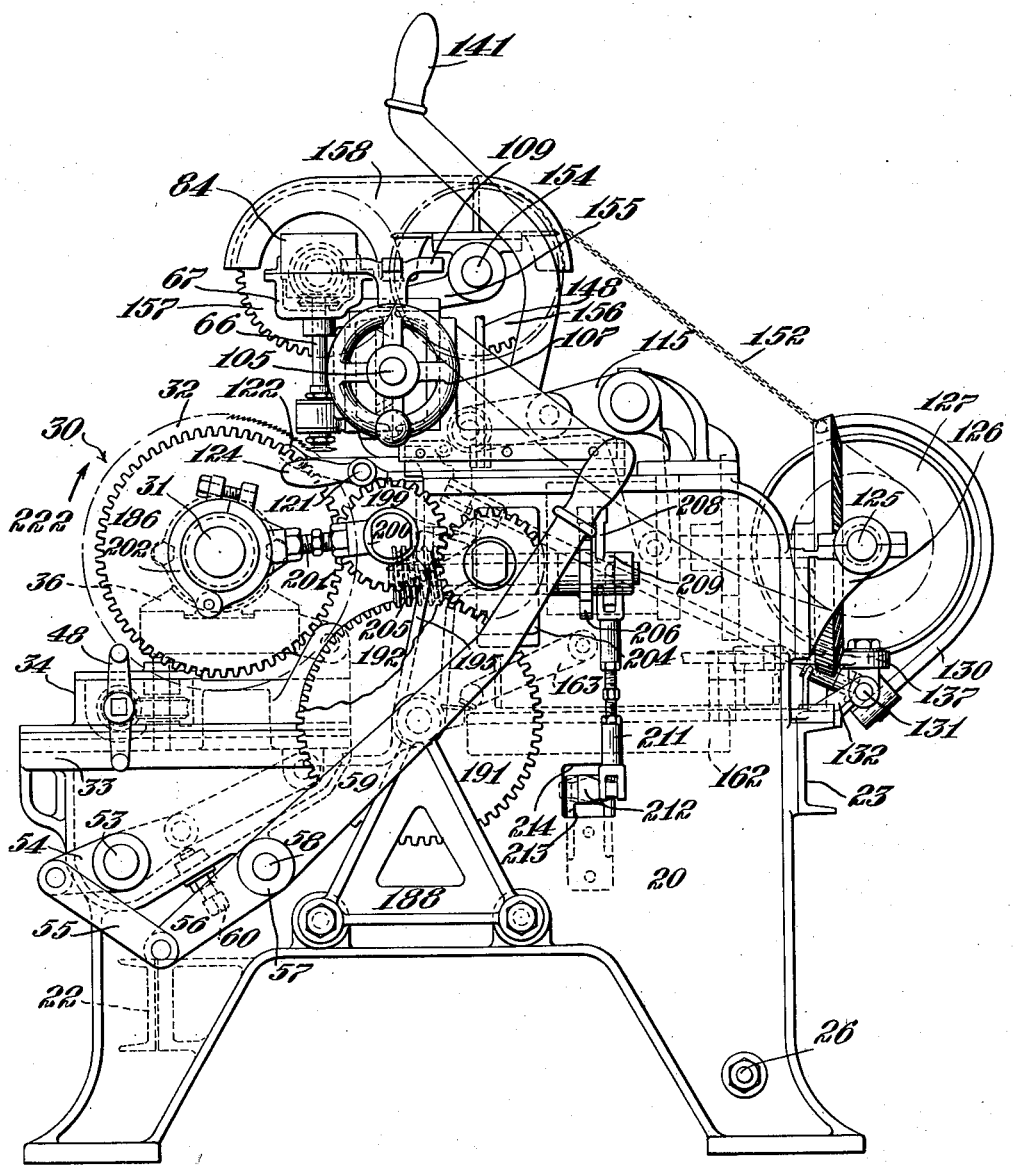

The illustrated machine comprises a frame consisting of end members 20 and 21 joined by transversely extending angle beams 22, 23, and 25 and a tie rod 26. A guard rail 27 connects the ends of the beams 23 and 25 which project beyond the end member 21.

The circular gin saw 30 to be gummed is supported upon the end members 20 and 21 at the front of the machine. The gin saw 30 comprises an arbor 31 upon which are secured a plurality of parallel circular blades 32 spaced a uniform distance apart. The saw supporting arm 33 of each end member is channelled transversely of the machine to receive a block 34. Carried by the blocks 34 are pillows 35 on which rest the journal bearings 36 in which the arbor 31 rotates. It will be understood that in accordance with the general practice the bearings 36 are carried by the arbor 31 and removably secured to the pillows 35. The inner end of the pillow 35 is pivoted to ears 36 on the block 34 and its outer end rests upon a stud 37. The stud 37 extends through bosses 38 and 39 formed above and below a plate 40 which normally closes a cavity 41 in the forward end of the block. The stud 37 is externally threaded and carries a pinion 42 within the cavity 41 and below the boss 39. A second boss 43 formed in the base of the cavity receives the lower end of the stud below the pinion. The stud 37 is keyed to the plate 40 to prevent the rotation of the stud and insure that the rotation of the pinion raises or lowers the stud. In the arm 33 of each end member is formed a chamber 44 and a slot 45 in the upper wall of the arm and in register with the chamber. Supported in bearings carried by the side walls of the cavity 41 is a rotatable shaft 46 to which is fixed in each cavity 41 a worm gear 47 in mesh with the pinion 42. A handle 48 is fixed at one end of the shaft 46 so that it may be rotated to raise or lower the studs 37 and thus swing the pillows 35 on their pivots.

The blocks 34 and other saw supporting elements associated therewith are reciprocable as a unit over the arms 33 to facilitate the mounting and removing of the gin saw 30. Projecting from the under side of the block 34 near its rear end is an ear 50 which projects through the slot 45 and is connected by a link 51 with an arm 52 keyed to a rock shaft 53 which, as shown in Fig. 1, are within the chamber 44. The shaft 53 is journaled in bearings mounted in the side walls of the chambers 44 and to one outer end (that at the right being here shown) is fixed an arm 54. The arm 54 is connected by a link 55 with an arm 56 projecting from a sleeve 57 rotatable on a stud 58 and provided with a handle 59. A set screw 60 in the bottom wall of the chamber 44 limits the movement of the rock shaft in one direction. Thus through the handle 59 the blocks 34 carrying the gin saw are moved over the arms 33. As shown in Fig. 4, each arm 33 is provided with a track defined by the side walls 61 to which are secured plates 62 that extend over the side flanges 63 of the base of the block 34. Gibs 64 secured to the flanges 63 reduce to a minimum any upward movement of the blocks 34 during the gumming operation.

The gumming of the saw teeth is performed by a plurality of disk files 65 arranged to gum every fourth blade 32 (see Fig. 3) each file being mounted upon a rotatable vertical shaft 66 as shown in Fig. 6. The shafts 66 are journaled in the upper and lower brackets 67 and 68 carried by a channel beam 69. The lower bracket 68 is here shown as integral with the beam 69 while the upper bracket 67 is bolted to the upper flange of the beam. In the upper bracket 67 is mounted a sleeve 70 which is keyed to the shaft 66. The portion 71 of the shaft 66 which extends through the bracket 68 is externally threaded to receive nuts 72 by which the height of the shaft 66 may be adjusted. An annular bearing 73 within the bracket 68 surrounds the threaded portion 71 of the shaft 66. The opening through the bracket 68 is closed at top and bottom by plates 74 and the outer race of the bearing is clamped against the bottom plate 74 by a collar 75. The nuts 72 bear against the upper and lower edges of collars 76 and 77 which bear against the inner race of the bearing 73. The collars 76 and 77 are of such length that they project beyond the plates 74 and hence the nuts 72 are held out of contact with such plates. Thus the shafts 66 are firmly and rigidly positioned in the brackets by the nuts 72 to prevent shifting and yet are freely rotatable. Obviously by turning the nuts 72 the shafts 66 are aligned vertically. Fixed at the upper end of each shaft 66 is a bevel gear 80 which meshes with a bevel gear 81 fixed to a shaft 82. As shown particularly in Fig. 6, the bracket 67 includes a longitudinally extending channel 83 which is closed by a cap plate 84 to form a chamber which encloses the gears 80 and 81 and the shaft 82.

The beam 69 with the elements carried thereby is supported by carriages 85 reciprocable transversely of the machine. The carriages 85 are guided upon the end members 20 and 21 in tracks 86 fixed to the tops of the end members and each carriage includes a vertical flange 87 spaced from the forward edge of the carriage to form a pocket in which is mounted a channel beam 88. That beam extends longitudinally of the machine in register with the beam 69 and forms therewith a longitudinally extending channel 89. Suitably spaced dovetailed blocks 90 and 91, here shown as integral with the beams 69 and 88, respectively, form a connection between the beams which permits longitudinal reciprocation of the beam 69 relative to the beam 88. Rotatable within the channel 89 near the right end thereof is a shaft 92 supported at one end by a sleeve 93 fixed to the stationary beam 88. Collars 94 and 95 secured to the shaft 92 at each end of the sleeve 93 prevent any longitudinal movement of the shaft relative to the beam 88. A bevel gear 96 carried by the collar 95 meshes with a bevel gear 97 on one end of a shaft 98 which is passed through the beam 88 and supported by a bracket 99 and which is rotated by means to be described below to rotate the shaft 92. The other end of the shaft 92 is threaded into an internally threaded sleeve 100 having collars 101 and 102 at the ends thereof. The sleeve 100 is rotatably supported in a bracket 103 bolted to the inner face of the movable beam 69, with the collars 101 and 102 at the ends of the bracket.

A shaft 105 supported in a bracket 106 at the right end (Fig. 3) of the beam 69 enters the sleeve 100 and is pinned thereto as through the collar 102. Fixed at the outer end of the shaft 105 is a hand wheel 107 (Fig. 8) by which the shaft is rotatable manually. A vertical stud 108 carried by the bracket 106 and rotatable by a handle 109 (Fig. 3) acts to lock the shaft 105 against rotation. When the shaft 105 is unlocked and rotated the sleeve 100 turning on the threaded end of the shaft 92 moves the beam 69 longitudinally of the beam 88. When however, the shaft 105 is locked the sleeve 100 is held stationary so that the beam 69 is moved longitudinally of the beam 88 by the rotation of the shaft 92 through the shaft 98. Movement of the beam 69 to the right (Fig. 3) is limited by an adjustable set screw 110 which is carried by a bracket 111 fixed to the stationary beam 88 and is so positioned that it is engaged by a block 112 mounted on the movable beam 69.

The carriage 85 on which the disk files 65 and the operating mechanism described above are mounted is movable toward and from the front of the machine by arms 115 keyed to a rock shaft 116 and connected by links 117 to stub shafts 118 carried by brackets 119 mounted upon the beam 88 near each end thereof.

The blades 32 of the gin saw 30 are supported during the gumming operation by a series of plates 120 fixed upon a shaft 121. Each plate 120 has a plurality of fingers 122 adapted to enter the spaces between the blades 32 near that portion of the blade peripheries with which the files engage. The fingers 122 are preferably enlarged laterally at the outer ends so that any vibration of the blades is held at a minimum. The shaft 121 is attached by a plurality of brackets 123 to the angle beam 24 and is provided at one end with a handle 124 by which the fingers 122 are swung into position between the blades.

The main drive shaft 125, mounted upon brackets 126 supported by the end members 20 and 21, is driven from any suitable source of power. As here shown the shaft 125 carries a drive pulley 127 and an idle pulley 128 adapted to be selectively engaged by a driven belt (not shown). The belt extends through a belt shipper 130 carried by a shipper rod 131, reciprocable in brackets 132 mounted on the angle beam 23. The shipper rod 131 is normally in the position in which the belt engages the idle pulley 128 and is so held by any suitable yielding means as for example a spring 133 between one of the brackets 132 and a collar 134 fixed to the rod. A bell crank lever 135 pivotally mounted upon a plate 136 fixed to the angle beam 23 is provided to shift the rod 131 out of its normal position into the position shown in Fig. 3 wherein the shipper 130 holds the belt in engagement with the drive pulley 127. One arm of the lever 135 is attached to the rod through a pivotal connection 137 while the other arm is connected by a link 138 to one arm of a second bell crank lever 139 pivotally supported upon a bracket 140 mounted on the angle beam 25. The other arm of the lever 139 is provided with an upstanding handle 141 by which the levers are manually actuated. The shipper rod 131 is held in the position shown in Fig. 3 by a latch 142 which engages a pin 143 on the rod. The latch 142 is fixed upon the rear end of a rod 144 rotatable in brackets 145 and 146 mounted on the angle beams 23 and 24 respectively. The rod 144 is normally held in such position that the latch 142 will engage the pin 143 by any suitable means such as a spring (not shown). Fixed to the front end of the rod is an upstanding plate 147 to which is secured a vertical arm 148. The plate 147 is in the line of travel of a bracket 149 mounted on the movable beam 69. The bracket 149 carries an adjustable set screw 150 which is adapted to trip the plate 147 thereby rocking the rod 144 and disengaging the latch 142.

The disk files 65 are continuously rotated during the operation of the machine by the drive shaft 125. Fixed at one end (that at the left in Fig. 3) is a pulley 151 connected through a belt or chain 152 with a pulley 153 carried by a shaft 154 journaled in a bearing 155 mounted upon the angle beam 88. Keyed to the shaft 154 is a gear 156 which is in mesh with a gear 157 mounted on the shaft 82 by which the disk files 65 are rotated. Since the gear 157 is carried by the longitudinally movable beam 69, the gear 156 is made much wider than the gear 157 so that this movement of the beam will not interrupt the intermeshing of the gears. A hood 158 carried by the beam 88 substantially encloses the gears 156 and 157.

The operation of the gin saw indexing mechanism by which the saw teeth are successively fed to the disk files, the reciprocation of the files toward and away from the gin saw and the step by step travel of the files from blade to blade are all controlled by a gear box 160. The box 160 rests on and is removably bolted to a plate 161 supported on the angle beams 23 and 24 and provided with a flange 162 removably fixed to the end member 20. Journaled in bearings on the front and rear walls of the box 160 are three parallel shafts 163, 164, and 165. The shaft 164 projects through the rear wall of the gear box and on it is mounted a bevel gear 166 which meshes continuously with a pinion 167 fixed upon the drive shaft 125. Keyed to the shaft 164 within the gear box is gear 168 which meshes continuously with a gear 169 keyed to the shaft 163. The shaft 164 also carries within the gear box a double faced clutch 170 comprising a central disk 171 keyed to the shaft and a pair of clutch plates 172 and 173, which are intermittently actuated.

The clutch plate 172 includes a gear 174 which is mounted outside the gear box and which through a gear 175 supported by the bracket 99 and a gear 176 carried by the shaft 98, rotates such shaft to move the beam 69 on which the disk files are mounted longitudinally and shift the files from one group of saw blades to another group of saw blades.

The clutch plate 173 includes a gear 177 which meshes with a gear 178 keyed to the shaft 165 so that when the clutch plate is in operation the shaft 165 is rotated. Keyed to the shaft 165 are a sleeve 179 having a cam track 180 in its periphery and a cam disk 181. An arm 182 depending from the rock shaft 116 (here shown as integral with the arm 115 adjacent the end member 20) carries a roller 183 which travels in the cam track 180. Thus the rotation of the shaft 165 actuates the rock shaft 116 which through the mechanism previously described reciprocates the carriage 85 to move the disk files into and out of gumming engagement with the gin saw.

The indexing of the gin saw, that is the intermittent rotation of the saw after each gumming of the teeth, is controlled by the cam disk 181 through the following mechanism. Fixed to the arbor 31 of each gin saw 30 outside the bearings 36 which are bolted to the pillows 35 and in which the arbor is freely rotated, is a gear wheel 186 by which the arbor is rotated. A countershaft 187 is supported at one end in bearings carried by a frame 188 bolted to the end member 20 and spaced therefrom by sleeves 189 and at the other end in a bearing carried by a bracket 190 fixed to the plate 161 on which the gear box 160 rests and to the angle beam 25. Mounted on the countershaft 187 between the end member 20 and the frame 188 are a gear wheel 191 and worm wheel 192. A gear wheel 193 in mesh with the wheel 191 is rotatably supported on a stub shaft 194 fixed at one end to an arm 195 carried by a sleeve 196 rotatable on the countershaft 187 between the wheels 191 and 192. A collar 197 holds the wheel 193 against substantial travel longitudinally of the stub shaft. Also carried by the arm 195 is a second stub shaft 198 carrying a freely rotatable gear wheel 199 which is held in position on the stub shaft 198 by a collar 200 connected by an adjustable link 201 to a collar 202 freely rotatable on the arbor 31 outside the gear wheel 186. As shown in Figs. 1 and 2 the wheels 193 and 199 are held in mesh with each other by the arm 195, the wheel 193 is also held in mesh with the wheel 191 by the arm 195 and the wheel 199 is also held in mesh with the wheel 186 by the collar 200, link 201, and collar 202. Thus despite the movement of the gin saw toward and from the disk files the wheels 186, 199, 193, and 191 remain at all times in mesh with each other.

Keyed on a rock shaft 203 supported in bearings carried by a bracket 204 mounted on the end member 20 is a worm pinion 205 which meshes with the worm wheel 192. A ratchet 206 is keyed to the rock shaft 203. A pawl 207 is carried by an arm 208 fixed to a collar 209 freely rotatable on the rock shaft 203. From a second arm 210 projecting from the collar 209 at an angle to the arm 208 depends an adjustable link 211. The lower end of the link 211 is pivotally attached to one end of a rack bar 212 which is pivoted intermediate its ends on a bracket 213. The bracket is fixed to the inner face of the end member 20 and the bar projects through an opening 214 in the member 20. Freely rotatable on a rod supported by a bracket 215 mounted on the plate 161 within the gear box below the cam disk 181, is a sleeve 216. An arm 217 projecting from the sleeve is connected with the rock bar 212 by a link 218 which passes through a hole 219 in the plate 161. A pair of parallel arms 220 projecting from the sleeve 216 support a roller 221 in contact with the periphery of the cam disk 181. Hence upon each rotation of the cam disk the pawl 207 advances the ratchet one step thereby, through the worm pinion 205, worm wheel 192, countershaft 187, and sprocket wheels 191, 193, 199, and 186, advancing the gin saw the distance of one tooth. As indicated by the arrow 222, the gin saw is rotated so that the teeth thereof are advanced to the files (clockwise in Fig. 1) thereby reducing to a minimum any lost motion or backlash and insuring uniformity in tooth contour.

Since the disk files complete the gumming of one group of saw blades before they are shifted to the adjacent group, it will be apparent that the clutch plate 172 operates for a single revolution only after each group of blades has been gummed and that the clutch plate 173 operates continuously except during the period when the clutch plate 172 operates. The relative operations of these clutch plates 172 and 173 are controlled by the shaft 163 through the following mechanism.

The clutch plates 172 and 173 are of an old well known type and similar in construction so that a description of one alone will be necessary. Mounted in a socket 225 in the clutch plate 172 is a pin 226, the base 227 of which is cylindrical and seated in the socket 225. Fixed to the base 227 is a stud 228 which extends through a slot 229 beyond the periphery of the plate below an extension 230 of that periphery. The end 231 of the pin beyond the socket is cut away to form an arcuate surface which, when the stud 228 is in contact with the extension 230, as shown in Fig. 10, is a section of a cylinder about the center of the plate. The end surface of the main body 171 of the clutch adjacent the plate 172 has an annular central depression 232 bouded by a wall 233 interrupted by a notch 234 (Fig. 11). When the plate 172 is as shown in Fig. 10, the end 231 of the pin 226 rides in the depression 232 so that the body 171 rotates freely and the plate 172 is idle. A leaf spring 236 seated in a pocket 235 engages a notch 237 in the base 227 of the pin and tends to rotate the pin, moving the stud 228 away from the extension 230. An arm 240, however, is so mounted, as will be pointed out below, that it opposes the urge of the spring 235 and holds the stud 228 against the extension 230. When the arm 240 is shifted to release the stud 228, the pin 226 is rotated in the socket 225 by the leaf spring 235, as soon as the pin is in register with the notch 234, until the end 231 is engaged by one wall of the notch and the plate 172 rotated with the body 171 until the stud 228 is engaged by the arm 240 and returned into engagement with the extension 230. The arm 240 and an arm 241 which actuates the clutch plate 173 in a similar manner are connected by a strap 242 so that they move in unison and the arms are pivotally supported in a vertical plan by brackets 243 and 244 respectively. The clutch plate 172 is yieldably held against rotation by a vertical leaf spring 245 which engages a block 246 embedded in the periphery of the plate and offset from the extension 230. The spring 245 is mounted in a bracket 247 on the plate 161 within the gear box and is of such length that when the clutch plate is at rest the block 246 rests on the top of the leaf 245. Mounted on the end of the leaf 245 is a shorter leaf 248, the tip of which extends beyond the end of the leaf 245 and is bent to form a pocket 249 in which the block 246 rests. The plate 172 is thus yieldably caught at the completion of each rotation.

The actuation of the clutch plates 172 and 173 is controlled by the shaft 163 of the gear box. This shaft as previously pointed out is continuously rotated from the driven shaft 164 through the gears 168 and 169. Carried by the shaft 163 is a clutch 250 which comprises a main body 251 keyed to the shaft and a clutch plate 252. Attached to the clutch plate 252 and rotatable therewith is a cam disk 253 and a sleeve 254 having a peripheral cam track 255. The clutch 250 is of the type previously described, the clutch plate 252 having an extension 256 and a stud 257, and the latter being held in contact with the former by an arm 258, and being yieldably held against rotation by a leaf spring 259. The arm 258 is fixed to a rock shaft 260 supported in brackets 261, 262. Fixed to the end of the shaft 260 beyond the bracket 261 is one end of an arm 263 having a boss 264 extending from the other end of the arm and at right angles thereto. The arm 263 passes through a slot 265 in the front wall of the gear box and normally rests on the flange thereof. The boss 264 extends across a slot 266 in the flange of the gear box and in the plate 161. A finger 267 carried by the countershaft 187 passes through the slot tripping the arm 263 and rocking the shaft 260. The arm 258 is thus swung away from the stud 257 and thereupon the clutch plate 252 is actuated.

Figure 9:
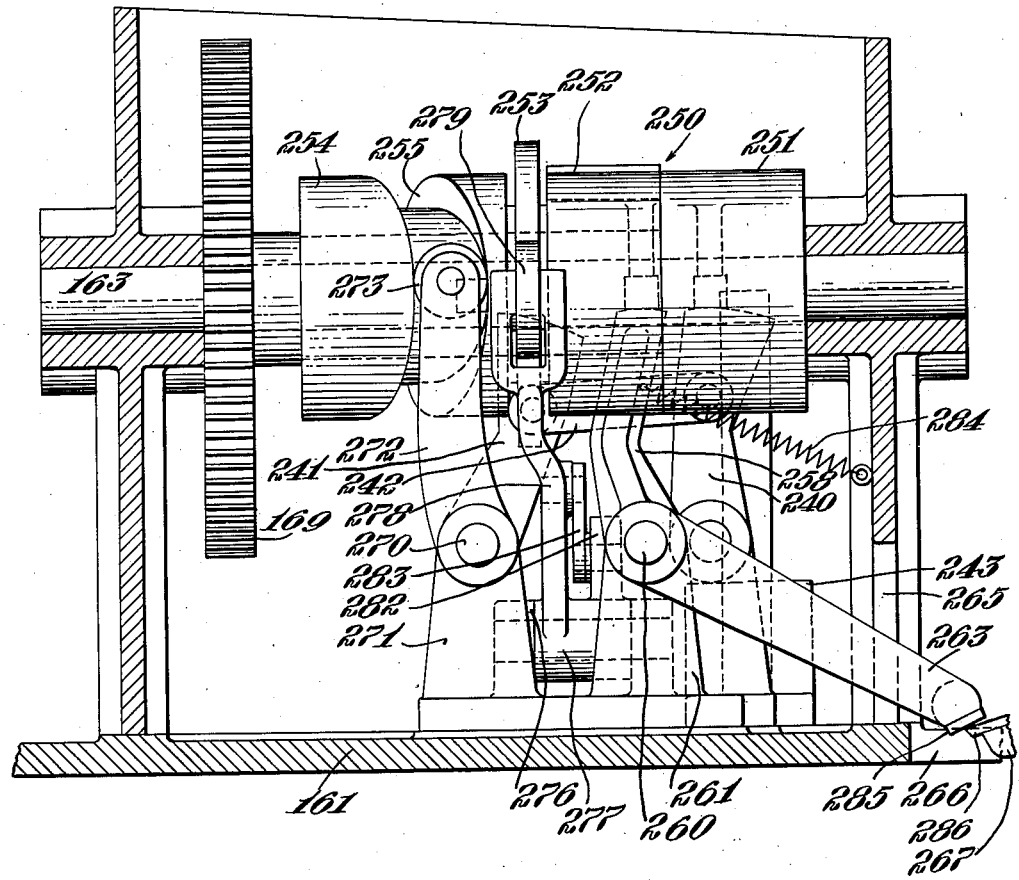
Fig. 9 is a view in elevation of a portion of the gear box unit.

The arm 241 is fixed to a rock shaft 270 which passes under the sleeve 254 being supported at one end in the bracket 244 and at the other end in a bracket 271. Secured to the end of the rock shaft 270 adjacent the bracket 271 is an arm 272 which carries a roller 273 received in the cam track 255. When the sleeve is rotated by the clutch plate 252 the arms 240 and 241 are thus swung on their pivots. As shown in Fig. 7, the arm 240 normally holds the clutch plate 172 at rest while the arm 241 is normally out of contact with the stud 228 and the clutch plate 173 is free to operate. When the arms 240 and 241 are swung by the cam track 255 they move first to the left in Fig. 9, and then return to the normal position. During this movement which takes place in a single rotation of the clutch plate 252 the following conditions are created in succession. First the arm 241 stops the operation of the clutch plate 173 while the clutch plate 172 is still at rest; second, while the clutch plate 173 is held at rest, the clutch plate 172 is released and allowed to operate; third, both clutch plates are again at rest; and fourth, the initial condition is restored with the clutch plate 173 operating and the clutch plate 172 at rest.

Since the countershaft 187 comes to rest after tripping the arm 263, if the boss 264 is allowed to remain on the finger the clutch plate 252 would continue to rotate and in order to prevent this the following means are provided. The shaft 260 is so mounted that it not only rocks in the brackets 261, 262 but is movable by the cam disk 253. Rotatable about a rod 275 supported in the bracket 261 and a bracket 276 is a sleeve 277 from which projects an arm 278 carrying a roller 279 held yieldably in contact with the periphery of the cam disk 253. Fixed to the rock shaft 260 between the brackets 261 and 262 is a collar 280. A coil spring 281 surrounds the shaft 260 and, bearing against the collar 280 and the bracket 261, normally holds the shaft in the position shown in Fig. 8 with the boss 264 over the slot 266. Pivoted on the bracket 261 is a finger 282 which rests against the collar 280 being held in such position by a link 283 connecting the finger 282 with the arm 278. The movement imparted to the arm 278 by the cam disk 253 thus rocks the finger 282 and causes it to shift the shaft 260 longitudinally until the boss 264 is out of engagement with the finger 267 whereupon the arm 263 swings down under the urge of a spring 284 which draws the arm 258 into position to stop the operation of the clutch plate 252 after completing a single revolution. Due to the frictional and sliding contacts between the boss 264 and the finger 267, it has been discovered that considerable wear takes place. In order to correct this condition, wear plates 285 and 286 are secured to the end of the arm 263 and of the finger 267 respectively.

The gin saw gumming machine shown in the accompanying drawings and already described in detail will be operated in the following manner. It is assumed that the shipper 130 has been shifted to the left of the position shown in Fig. 3 to carry the drive belt into engagement with the idler pulley 128 so that the machine is at rest and that the disk files 65 have been set in the position shown in Fig. 3 by rotating the shaft 105 through the hand wheel 107 and that the shaft has been locked by the stud 108 (Fig. 8).

The gin saw 30 to be gummed is mounted on the blocks 34 of the arms 33 of the end members, the blocks having been moved outwardly (to the left in Fig. 1) by swinging the handle 59 counterclockwise and the journal bearings 36 are bolted in position on the pillows 35. On the right end of the arbor 31 is fixed the gear 186 and beyond it the collar 202 so that the gin saw will be controlled by the indexing mechanism. The blocks 34 are then moved inwardly by the handle and the fingers 122 swung unto position between the blades 32 by rotating the shaft 121. By rotating the shaft 46 the pillows 35 are raised or lowered so that the saw blades are in the desired relation to the disk files 65.

The shipper rod 131 is then moved by the handle 141 into the position shown in Fig. 3 and locked there by engagement of the pin 143 with the latch 142. The shaft 125 then rotates the disk files 65 continuously through the pulley 151 while the file supporting carriages 85 are reciprocated and the gin saw indexed through gears 166, 177 and the normally operative clutch plate 173. The countershaft 187 is so set that after the saw has made a complete rotation the finger 267 carried thereby trips the arm 263 throwing the clutch 250 into operation. The disk files 65 are at this time retracted out of contact with the gin saw and are through the shaft 92 shifted one step to the left in Fig. 3 to bring the files into position for engagement with the next group of blades through the clutch plate 172. The clutch plate 173 which, during this movement of the files was at rest so that the carriages 85 and the saw indexing mechanism were also at rest, is thereupon thrown and the gumming of the next group of blades is performed. These operations continue until all the teeth of the gin saw have been gummed. After the completion of the gumming of the last group of blades the further travel of the files to the left (Fig. 3) initiated by the tripping of the arm 263 by the finger 267 causes the set screw 150 to trip the plate 147 thus disengaging the latch 142 from the pin 143 so that the spring 133 moves the shipper 131 to the left and stops the machine.

Should, at any time during the operation of the gumming machine, it be desired to stop the machine the operator tilts the arm 148 and thus disengages the latch 142 from the pin 143. It will be noted that the moving elements remain in the position in which the gumming was going on so that as soon as the machine is again started by the handle 141 the gumming continues at the point where it left off without the necessity for any adjustment by the operator.

From the above description it will be apparent that, except for the preliminary setting of the gin saw and disk files the gumming operation initiated by the handle 141 proceeds automatically until the gumming has been completed. It will also be apparent that the reciprocation and longitudinal travel of the disk files and the indexing of the gin saw take place in timed relation to each other, the reciprocation of the disk files and the saw indexing mechanism acting in sequence, the longitudinal travel of the disk files occurring when the reciprocation thereof and the saw indexing mechanism are at rest and such longitudinal travel being initiated by the saw indexing mechanism.

While one embodiment of this invention has been shown and described in detail, it will be understood that the invention is not limited thereto and that other embodiments thereof can be made without departing from the spirit and scope of the invention as set forth in the following claims.

I claim:

1. A machine for gumming the teeth of a gin saw comprising a frame having end members, carriages reciprocable on said end members, a longitudinally extending shaft mounted for rotation in said carriages, file shafts supported in bearings mounted on said carriages at right angles to said first named shaft, disk files on said file shafts, means for rotating said first named shaft, gearing through which said file shafts are rotated by said first named shaft to gum the teeth of a gin saw and means for reciprocating said carriages on said end members while the shafts are rotating to move the longitudinally extending shaft, file shafts and disk files into and out of gumming engagement with said gin saw.

2. A machine for gumming the teeth of a gin saw comprising a frame, carriages reciprocable on said frame at right angles thereto, a beam supported by said carriages and longitudinally reciprocable at right angles thereto, a shaft mounted for rotation in bearings rigidly supported by said beam parallel to said beam, a plurality of file shafts mounted for rotation in bearings rigidly supported by said beam at right angles to said first named shaft, disk files on said file shafts, means for rotating said first named shaft, gearing through which said file shafts are rotated by said first named shaft to cause the disk files to gum the teeth of a gin saw and means for reciprocating said carriages while the shafts are rotating to move the disk files into and out of gumming engagement with said gin saw.

3. A machine for gumming the teeth of a gin saw comprising a frame, carriages reciprocable on said frame at right angles thereto, a beam supported by said carriages and longitudinally reciprocable at right angles thereto, a shaft, mounted for rotation in bearings rigidly supported by said beam, parallel to said beam, a plurality of file shafts mounted for rotation in bearings rigidly supported by said beam at right angles to said first named shaft, disk files on said file shafts, means for rotating said first named shaft, gearing through which said file shafts are rotated by said first named shaft to cause the disk files to gum the teeth of a gin saw, means for reciprocating said carriages while the shafts are rotating to move the disk files into and out of gumming engagement with said gin saw, and means for shifting said beam together with the shafts, bearings, and files at right angles to the travel of the carriages while the disk files are out of gumming engagement with said gin saw.

4. A machine for gumming the teeth of a gin saw comprising a frame, carriages reciprocable on said frame at right angles thereto, a beam supported by said carriages and longitudinally reciprocable at right angles thereto, a shaft, mounted for rotation in bearings rigidly supported by said beam, parallel to said beam, a plurality of file shafts mounted for rotation in bearings rigidly supported by said beam at right angles to said first named shaft, disk files on said file shafts, means for rotating said first named shaft, gearing through which said file shafts are rotated by said first named shaft to cause the disk files to gum the teeth of a gin saw, means for reciprocating said carriages while the shafts are rotating to move the disk files into and out of gumming engagement with said gin saw, and means for holding said disk files out of such gumming engagement and for concomitantly moving said beam together with the shafts, bearings and files at right angles to the travel of the carriages.

5. A machine for gumming the teeth of a gin saw comprising a frame, carriages reciprocable on said frame at right angles thereto, a beam supported by said carriages and longitudinally reciprocable at right angles thereto, a shaft, mounted for rotation in bearings rigidly supported by said beam, parallel to said beam, a plurality of file shafts mounted for rotation in bearings rigidly supported by said beam at right angles to said first named shaft, disk files on said file shafts, means for rotating said first named shaft, gearing through which said file shafts are rotated by said first named shaft to cause the disk files to gum the teeth of a gin saw, means for reciprocating said carriages while the shafts are rotating to move the disk files into and out of gumming engagement with said gin saw, means for indexing said gin saw in timed relation to the reciprocation of the carriages so that the saw is indexed each time the disk files are out of gumming engagement, and means actuated by said saw indexing means for holding said disk files out of such gumming engagement and for concomitantly moving said beam, together with shafts, bearings and files at right angles to the travel of the carriages.

6. A machine for gumming the teeth of a gin saw comprising a frame, carriages reciprocable on said frame at right angles thereto, a beam supported by said carriages and longitudinally reciprocable at right angles thereto, a shaft, mounted for rotation in bearings rigidly supported by said beam, parallel to said beam, a plurality of file shafts mounted for rotation in bearings rigidly supported by said beam at right angles to said first named shaft, disk files on said file shafts, means for rotating said first named shaft, gearing through which said file shafts are rotated by said first named shaft to cause the disk files to gum the teeth of a gin saw, means for reciprocating said carriages while the shafts are rotating to move the disk files into and out of gumming engagement with said gin saw, means for indexing said gin saw in timed relation to the reciprocation of the carriages so that the saw is indexed each time the disk files are out of such gumming engagement, mechanism for holding said disk files out of such gumming engagement and concomitantly moving said beam together with said shafts, bearings, and files at right angles to the travel of the carriages, and a finger actuated by said saw indexing means for causing said mechanism to operate.

7. A machine for gumming the teeth of a gin saw comprising a frame, carriages reciprocable on said frame at right angles thereto, a beam supported by said carriages and longitudinally reciprocable at right angles thereto, a shaft, mounted for rotation in bearings rigidly supported by said beam, parallel to said beam, a plurality of file shafts mounted for rotation in bearings rigidly supported by said beam at right angles to said first named shaft, disk files on said file shafts, means for rotating said first named shaft, gearing through which said file shafts are rotated by said first named shaft to cause the disk files to gum the teeth of a gin saw, means for reciprocating said carriages while the shafts are rotating to move the disk files into and out of gumming engagement with said gin saw, means for indexing said gin saw in timed relation to the reciprocation of the carriages so that the saw is indexed each time the disk files are out of such gumming engagement, means for moving said beam together with said shafts, bearings, and files at right angles to the travel of the carriages, and mechanism controlled by said saw indexing means for stopping the operation of said saw indexing means and of said carriage reciprocating means, and for actuating said beam-moving means.

8. A machine for gumming the teeth of a gin saw comprising a frame, carriages reciprocable on said frame at right angles thereto, a beam supported by said carriages and longitudinally reciprocable at right angles thereto, a shaft, mounted for rotation in bearings rigidly supported by said beam, parallel to said beam, a plurality of file shafts mounted for rotation in bearings rigidly supported by said beam at right angles to said first named shaft, disk files on said file shafts, and means for rotating said first named shaft, gearing through which said file shafts are rotated by said first named shaft to cause the disk files to gum the teeth of a gin saw, means for reciprocating said carriages while the shafts are rotating to move the disk files into and out of gumming engagement with said gin saw, means for indexing said gin saw in timed relation to the reciprocation of the carriages so that the saw is indexed each time the disk files are out of such gumming engagement, means for moving said beam together with said shafts, bearings, and files at right angles to the travel of the carriages, and mechanism for stopping the operation of said saw indexing means and of said carriage reciprocating means, and for actuating said beam moving means, and an element actuated by said saw indexing means for setting said mechanism into operation.

9. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file moving means is controlled, and means by which either of said clutch mechanisms is held idle and the other of said clutch mechanisms is set into operation.

10. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file moving means is controlled, and means actuated by said saw indexing means by which the first named clutch mechanism is held idle and the second named clutch mechanism is set into operation.

11. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file-moving means is controlled, and a clutch assembly by which either of said clutch mechanisms is held idle and the other of said clutch mechanisms is set into operation.

12. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file moving means is controlled, said first named clutch mechanism being normally in operation and said second named clutch mechanism being normally idle, and means adapted to be tripped by the saw indexing means for reversing the normal status of the clutch mechanisms.

13. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file moving means is controlled, said first named clutch mechanism being normally in operation and said second named clutch mechanism being normally idle, and a clutch assembly by which the normal status of said clutch mechanisms is reversed.

14. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file moving means is controlled, and a clutch assembly including an arm adapted to be tripped by an element of said saw indexing means whereupon the clutch assembly operates to hold the first named clutch mechanism idle and to permit the operation of the second named clutch mechanism.

15. In a machine for gumming the teeth of a gin saw by a plurality of files acting upon the blades of the saw in groups, means for reciprocating said files into and out of gumming engagement with a group of saw blades, means for indexing said saw after each such gumming engagement, means acting after the completion of the gumming of one group of blades for moving said files into position for gumming engagement with another group of blades, a source of power, clutch mechanism by which the operation from said source of the file reciprocating and saw indexing means is controlled and clutch mechanism by which the operation from said source of the file moving means is controlled, and a clutch assembly by which both of said clutch mechanisms are held idle and thereafter said second named clutch mechanism is permitted to operate while said first named clutch mechanism remains idle.

16. In a machine for gumming the teeth of a gin saw having a plurality of blades, the combination with a frame of a support for said saw mounted on said frame, a beam carried by said frame and reciprocable both longitudinally and laterally, a shaft mounted for rotation in bearings rigidly supported by said beam, a plurality of file shafts mounted for rotation in bearings rigidly supported by said beam at right angles to said first named shaft, disk files having equal angles mounted on said file shafts, means supported by said beam for rotating said first named shaft, means by which said file shafts are rotated from said first named shaft, and means carried by the frame for moving said beam and the elements carried thereby laterally of the beam to bring said disk files into and out of engagement with certain blades of said saw.

17. In a machine for gumming the teeth of a gin saw having a plurality of blades, the combination with a frame of a support for said saw mounted on said frame, a beam carried by said frame and reciprocable both longitudinally and laterally, a shaft mounted for rotation in bearings rigidly supported by said beam, a plurality of file shafts mounted for rotation in bearings rigidly supported by said beam at right angles to said first named shaft, disk files having equal angles mounted on said file shafts, means supported by said beam for rotating said first named shaft, means by which said file shafts are rotated from said first named shaft, and means carried by the frame for moving said beam and the elements carried thereby laterally of the beam to bring said disk files into and out of engagement with certain blades of said saw, and longitudinally of the beam to bring said disk files into engagement with certain other blades, said last named movement taking place when the disk files are out of engagement with the blades of the saw.

ROBERT INGLEE.